June 10, 1924.        1,497,638
A. V. POWELL
HAND PROPELLED VEHICLE
Original Filed Jan. 12, 1921    2 Sheets-Sheet 1
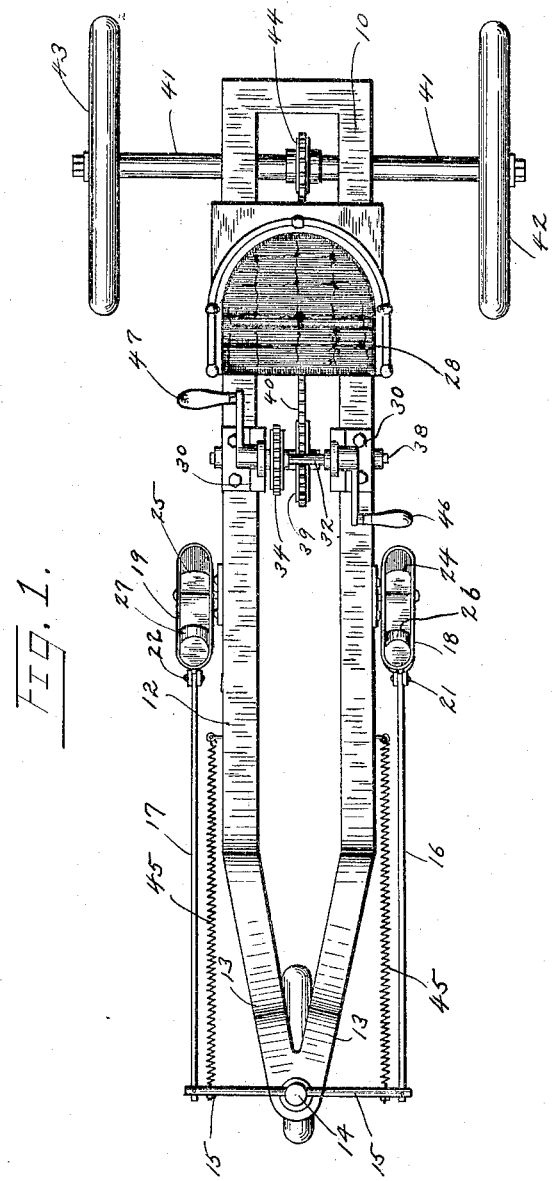
Inventor
ALONZO V. POWELL.

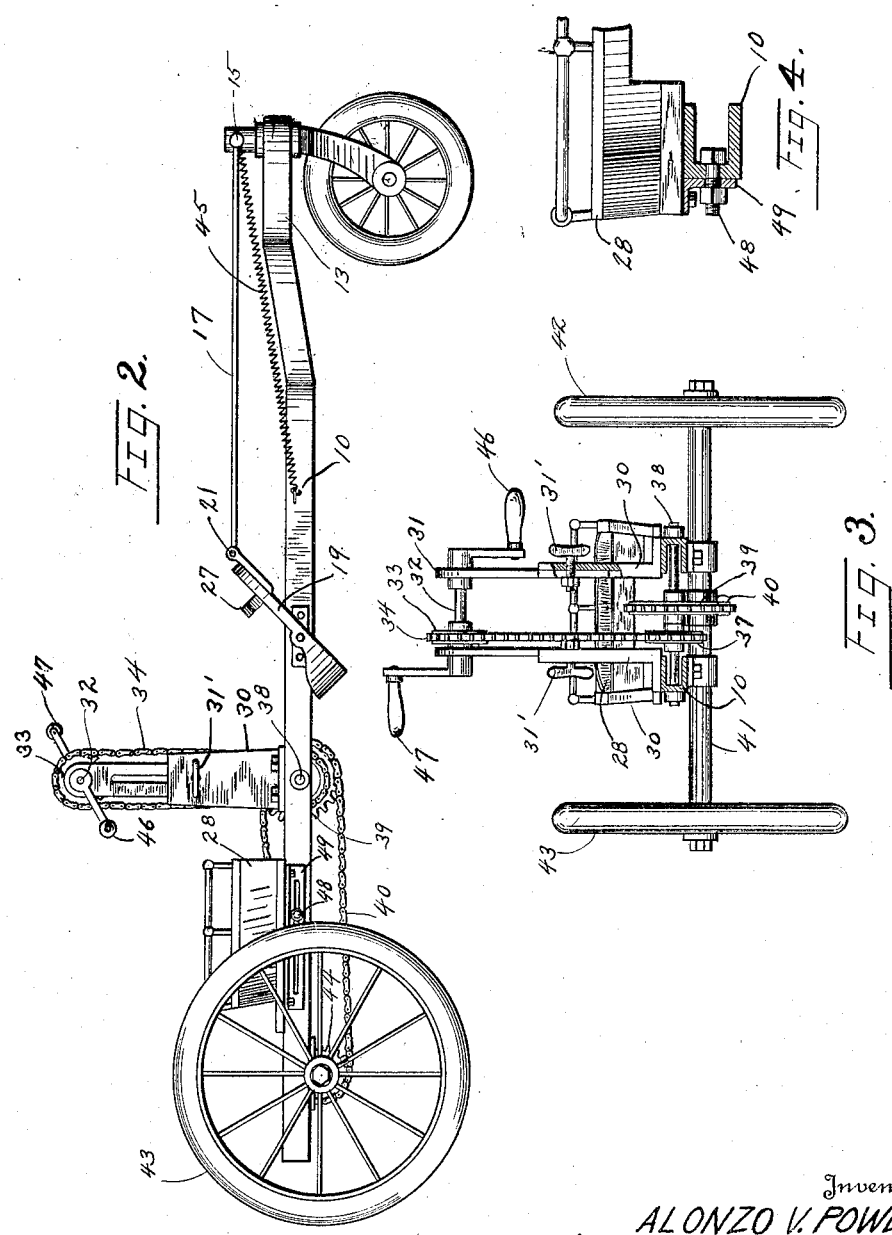

Patented June 10, 1924.

1,497,638

UNITED STATES PATENT OFFICE.

ALONZO V. POWELL, OF BOWLING GREEN, OHIO.

HAND-PROPELLED VEHICLE.

Application filed January 12, 1921, Serial No. 436,723. Renewed November 6, 1923.

*To all whom it may concern:*

Be it known that I, ALONZO V. POWELL, a citizen of the United States, residing at Bowling Green, in the county of Wood and State of Ohio, have invented certain new and useful Improvements in a Hand-Propelled Vehicle; and I do hereby declare the following to be a full, clear, and exact description of the invention, such as will enable others skilled in the art to which it appertains to make and use the same.

This invention relates to a hand propelled vehicle, and the object is to provide a small car adapted for the use of children, and also adapted for commercial purposes, in connection with the transportation of small packages and like loads.

A further object is to provide a vehicle, adapted for the purpose described, and comprising a body, wheels for mounting the rear portion thereof, a steering wheel, and particular means for applying power to the rear axle and rear wheels.

With the foregoing and other objects in view, the invention consists in the novel construction, combination, and arrangement of elements hereinafter described and claimed.

In the accompanying drawings:—

Figure 1 is a top plan view of the vehicle.

Figure 2 is a view in side elevation of the vehicle.

Figure 3 is a vertical transverse section through the frame, the structure in the rear of the pedals being in elevation, and Figure 4 is a detail view showing the manner of adjustably connecting the seat to the frame.

In carrying out my invention I provide a main frame comprising side bars 10 and 12, which merge at the forward portion into a narrow frame element 13, serving to mount the steering fork 14, which in turn carries a steering or cross bar 15. The cross bar is controlled by means of connecting rods 16 and 17, and the latter are operated by pedals 18 and 19.

The pedals are mounted to operate on the outer side of the frame, and of the side rails thereof, and they have pivotal connection with the rods just referred to, at the points 21 and 22. Heel rests 24 and 25 are carried by the respective pedals, and toe straps 26 and 27 are mounted as shown, and serve an obvious purpose. A driver's or operator's seat is designated 28.

Referring now to the operating mechanism, an adjustable frame 30 is mounted in a substantially vertical position, and may be positioned or adjusted to suit the operator, the exact position depending upon his height.

A crank shaft 32 is mounted in suitable bearings and serves to mount a sprocket wheel or sprocket wheels 33, driving chain or chains 34, which in turn impart movement to wheel or wheels 37 on transverse shaft 38. Mounted on the shaft 38 is a larger sprocket wheel 39 serving to drive sprocket chain 40. The rear axle 41 is mounted for rotation and serves to mount the rear wheels 42 and 43 on which the greater portion of the weight is carried. This axle last named carries a sprocket wheel 44 driven by means of the chain 40.

The crank shaft 32 is provided with handles 46 and 47 adapted to be grasped by the driver or operator, who being seated in proper position for operating the car, places his feet on the pedals, and thus controls the steering mechanism, while having his hands free to impart movement to the crank shaft and driving mechanism.

It is intended that the car thus constructed shall be manufactured in a substantial and durable manner, and shall still be of light construction, so that it may readily be handled by young children. It is obvious however that the device may be made in various sizes, suitable for children of different ages, and in the event of using the device for commercial purposes, for which it is also especially adapted, the use of the device will determine the size.

The vertical frame 30 includes the upper elements 31, slidable with reference to the lower portions of the frame, and retained by securing devices 31'. The operator's seat is adjustable toward and away from the vertical frame and pedals, bolts 48 passing through slots in the angle bars 49 secured to the seat, permitting a car of a given size to be used by children of different ages. The vehicle may also be made in different sizes, as previously stated, for use by adults, including crippled persons having the use of one or both hands.

After the steering wheel has been moved by either pedal, it is automatically returned to normal position by springs 45.

Having thus described the invention, what I claim is:—

In a device of the class described, side bars of U-shape in cross section having their webs vertically disposed and their side flanges horizontally disposed, an axle, means journaling the axle secured to the lower surfaces of the lower side flanges, wheels on said axle, a shaft disposed transversely of the side bars passing intermediate said side flanges and being journaled through said webs, means to drive said axle from said shaft, frames rising from said side bars, said frames having offset lower end portions secured to the top flanges of said side bars, a shaft journaled on said frame, and means to drive the first mentioned shaft from the second mentioned shaft.

In testimony whereof I affix my signature in presence of two witnesses.

ALONZO V. POWELL.

Witnesses:
L. V. Powell,
A. L. Powell.